Sept. 7, 1965 W. W. LOWE 3,205,454

RANDOM AMPLITUDE SAMPLING CIRCUIT

Filed Dec. 4, 1962

INVENTOR.
WILLIAM W. LOWE

BY V.C. Muller

ATTORNEY.

United States Patent Office 3,205,454

Patented Sept. 7, 1965

3,205,454

RANDOM AMPLITUDE SAMPLING CIRCUIT

William W. Lowe, Los Angeles, Calif., assignor to the United States of America as represented by the Secretary of the Navy Filed Dec. 4, 1962, Ser. No. 242,333
6 Claims. (Cl. 331—78)
(Granted under Title 35, U.S. Code (1952), sec. 266)

The invention described herein may be manufactured and used by or for the Government of the United States of America for governmental purposes without the payment of any royalties thereon or therefor.

This invention relates to an electronic device for generating sequential signals of normally distributed randomly variable amplitudes.

The most widely used prior art arrangement for generating normal or Gaussian distributions of random amplitude signals consisted of a natural source of Gaussian noise, such an electronic tube or transistor having inherent electron motion noises, an exceedingly high speed switching system for sampling short intervals of this noise, and amplifiers to amplify the amplitude of the sampled noise to useful levels. A well known difficulty of such arrangement is that it produces a limited standard deviation of the resultant probability distribution. This limitation is the result of the practical limitation in obtaining high speed switching, and even then elaborate complex circuitry is required to achieve these limits. Another difficulty is that the quality of the Gaussian probability distribution obtained with such apparatus depends solely upon the characteristics of the natural noise instrumentality, and thus varies between different units, and can only be determined by time consuming measurements of a large number of outputs.

An object of the present invention is to provide improved apparatus for generating normally distributed random amplitude signals.

Another object is to provide apparatus of the type referred to, which is capable of providing larger standard deviation of probability distribution than possible in the prior art.

Another object is to provide apparatus of the type referred to having selectively predeterminable quality of probability distribution.

A still further object is to provide such apparatus which is capable of producing probability distribution having larger standard deviation without need for elaborate high speed switching circuitry.

Other objects, advantages and novel features of the invention will become apparent from the following detailed description of the invention when considered in conjunction with the accompanying drawing wherein.

Figures 1, 2, 3, 4:
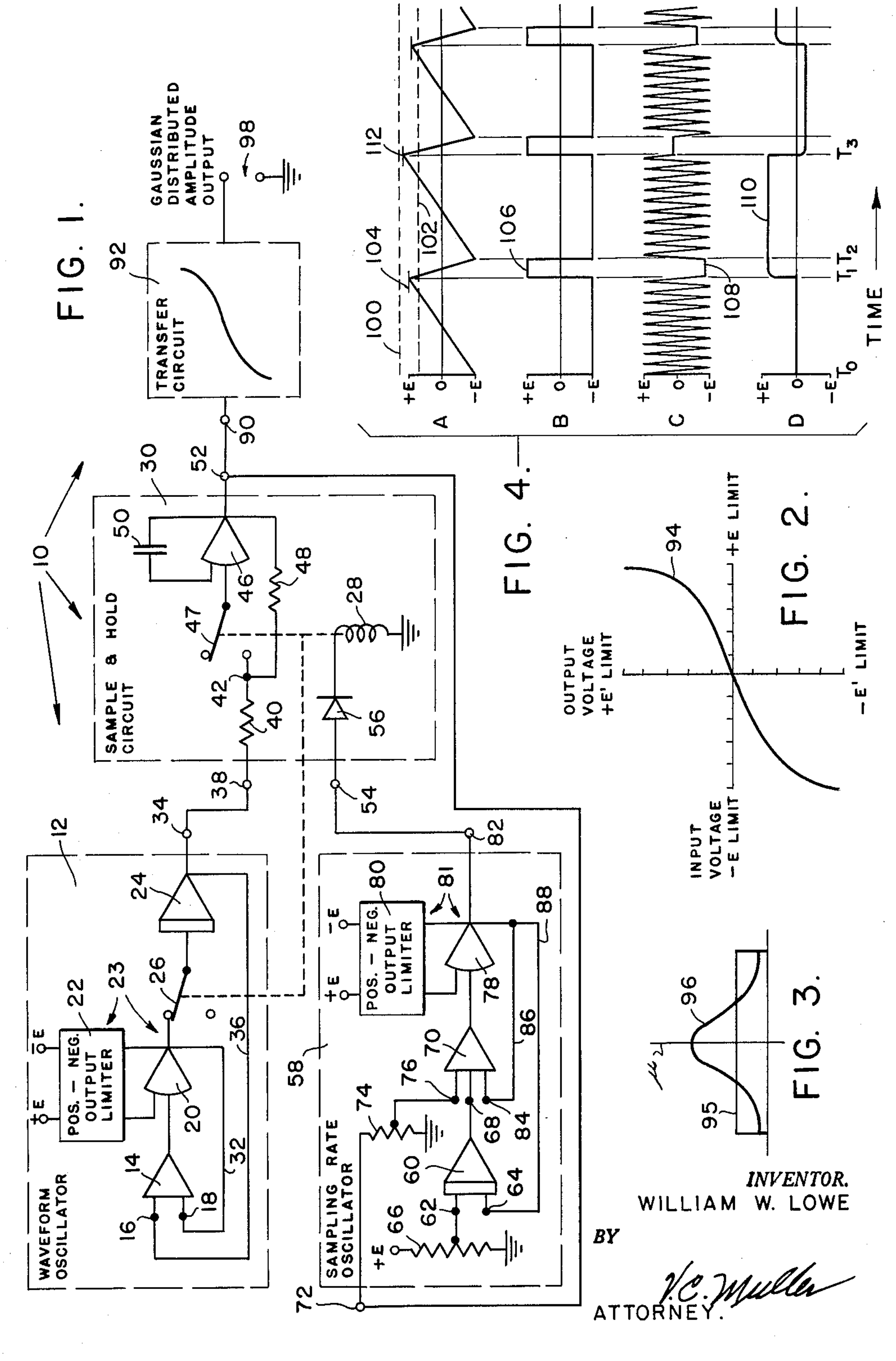
FIG. 1 is a schematic diagram of a circuit embodying the present invention.
FIG. 2 is a graph illustrating the input-output characteristic of the transfer circuit of FIG. 1.

FIG. 3 diagrammatically depicts the redistribution of probability distribution effected by the transfer circuit of FIG. 1; and FIG. 4 is a family of waveforms obtained at various circuit points of FIG. 1.

Referring now to the drawing, and particularly to FIG. 1, a circuit 10 for generating signals having normally distributed randomly variable amplitudes comprises a waveform generator 12 adapted to have a "stop control." Within waveform generator 12 is a summing amplifier 14 having a pair of input terminals 16 and 18. All amplifiers mentioned herein, including amplifier 14, are conventional operational type amplifiers, and are shown as such as conventional symbols in the drawing. The voltage of summing amplifier 14 is of a polarity depending upon the polarity of the algebraic sum of its input voltages and a magnitude corresponding to the magnitude of the sum. In the conventional manner of operational amplifiers, polarity inversion of the signal takes place across the amplifier. The output of summing amplifier 14 is applied to the input of a high gain amplifier 20 having a suitable shunt limiter 22 connected thereacross limiting its positive and negative outputs to the equal magnitudes, +E and —E, taken from a reference voltage supply. Amplifier 20 and its limiter 22 together form a bi-stable stage 23 producing a +E voltage at its output when the input is negative and producing a —E voltage when its input is positive. The output of bi-stable stage 23 is coupled to an integrating amplifier 24 through normally closed switch contacts 26, which are operated by a relay coil 28 in a sample and hold circuit 30, to be later described. The output of amplifier 20 is also applied to input 18 of summing amplifier 14 through a feedback line 32. Integrating amplifier 24 integrates the +E, or the —E voltage applied to its input, producing at its output a voltage signal having a magnitude that varies at a constant rate and is either positive going or negative going, depending upon the polarity of input. This output of integrating amplifier 24 is applied to the output terminal 34 for oscillator 12 and also to input 16 of summing amplifier 14 through another feedback line 36. The operation of circuit 12 is best illustrated by assuming that a net voltage of positive polarity is applied to summing amplifier 14 at its inputs, producing as the result of amplifier inversion a negative voltage at the output of summing amplifier 14, which in turn causes bi-stable stage 23 to assume the condition providing a voltage +E at its output. The +E output from bi-stable stage 23 is regeneratively fed back to input 18 of summing amplifier 14 where it is effective to reinforce and maintain the positive input conditions of summing amplifier 14. The +E output from bi-stable stage 23 is also applied to integrating amplifier 24, causing the voltage at its output to change at a constant rate in the negative going direction, which voltage is fed back to terminal 16 of summing amplifier 14. When the magnitude of output of amplifier 14 becomes more negative than —E, the net voltage applied to the input of the summing amplifier becomes negative, which results in a switch-over, or reversal, of outputs of summing amplifier 14 and of bi-stable stage 23, producing a voltage —E at its output. In response, the output of integrating amplifier 24 becomes positive, and when its magnitude exceeds +E another similar switch-over takes place and the cycle repeats itself. Accordingly, the operation of circuit 12 is to repetitively sweep the output of integrating amplifier back and forth between the voltages +E and —E, at a constant rate, providing what is known in the art as a triangular waveform.

Operatively associated with waveform oscillator 12 is the previously mentioned sample and holding circuit 30 including relay coil 28. The sampling and storage channel of circuit 30 comprises an input terminal 38 to which is applied the output from oscillator circuit 12. Within circuit 30 terminal 38 is connected to one end of an input resistor 40 having its other end connected to a junction point 42. Junction point 42 and the input of a high gain amplifier 46 are connected through normally open switch contacts 47, which like contacts 26 are also operated by relay coil 28. A feedback resistor 48 is connected between junction point 42 and the output of high gain amplifier 46, and a sample storage capacitor 50 is connected across high gain amplifier 46. The relative magnitude of input and feedback resistors 40 and 48 are so chosen that when contacts 47 are closed, amplifier 46 operates as a unitary gain amplifier. The relative magnitude of capacitance of storage capacitor 50 is so chosen that it becomes charged to the voltage coupled to input terminal 38 in a period of time that is short relative to the period of time that switch contacts 47 are held closed. When switch contacts 47 open, at the termination of the switching pulse, high gain amplifier 46 and storage capacitor 50 effectively operate an integrating amplifier having zero input and thus are effective to continue to provide the voltage stored in capacitor 50 at the amplifier output. The output of high gain amplifier 46 is connected to output terminal 52 for sample and hold circuit 30. The relay control channel comprises a switching pulse input terminal 54 which is connected to relay coil 28 through a polarity selective current switch diode 56, poled to pass positive switching pulses only. Each pulse applied to terminal 54 energizes relay coil 28, which actuates switch contacts 26 in oscillator circuit 12 to their open position, and actuates switch contact 47 in sample and hold circuit 30 to their closed position. Opening contact 26 removes all input to integrating amplifier 24, causing its output to stop at whatever the amplitude of output of integrating amplifier 24 may be at the moment the contact opens, and thus provides a stationary voltage amplitude signal at oscillator circuit output terminal 34. The switch contacts 47, now closed, couple the stationary amplitude signal appearing at terminal 34 to amplifier 46. As aforementioned, amplifier 46 acts as a unity gain amplifier, and inverts and couples the amplitude signal to output terminal 52, and also places a voltage charge on storage capacitor 50 equal to the signal amplitude. At the termination of the switching pulse, contacts 26 close, allowing oscillator 12 to continue in its operation. Simultaneously contacts 47 open, allowing amplifier 46 and storage capacitor 50 to operate as an integrating amplifier with a zero input, and as such amplifier 46 is effective to hold the amplitude signal at terminal 52 until the next relay switching pulse repeats the cycle. Accordingly, under repetitive operation, circuit 30 is effective to cooperate with waveform oscillator 12 to sample the amplitude of the output of integrator 24 at substantially the moment that a switching pulse is applied to control input terminal 54, and to hold this sample signal at output terminal 52 until the next switch pulse appears at control input terminal 54.

The switching pulse for operating relay coil 28 in sample and hold circuit 30 is furnished by a sample rate oscillator 58, which is selectively controllable to vary the delay interval between pulses. Oscillator circuit 58 comprises an integrating amplifier 60 having input terminals 62 and 64. Applied to terminal 62 is a fixed bias voltage from the tap of a resistive bleeder network 66 connected to the +E supply. Bleeder network 66 is chosen to provide an output voltage $k_1(+E)$ where $k_1$ is a constant of proportionality somewhat less than unity a typical value being $k_1=0.8$. The output of integrating amplifier 60 is applied to an input terminal 68 of a summing amplifier 70. The channel for controlling the delay interval between switching pulses comprises a control input terminal 72 connected to a fixed tap resistive attenuator network 74. The potential at the tap of attenuator network 74 is equal to $k_2$ times signal applied to control input terminal 72, where $k_2$ is a constant of proportionality less than unity. The potential at the tap of network 74 is applied to another input terminal 76 of summing amplifiers 70. The output of summing amplifier 70 is applied to input of a high gain amplifier 78 having an associated shunt limiter 80, which like limiter 22 cooperates with amplifier 78 to provide a bi-stable stage 81, which alternatively produces +E or —E voltages at its output. The output of bi-stable stage 81 is applied to output terminal 82 of sample rate oscillator 58, and also to an input terminal 84 of summing amplifier 70 through a feedback line 86, and to an input terminal 64 of integrator amplifier 60 through a feedback line 88. Operation of circuit 58 may be best illustrated by assuming that a positive voltage is applied to the input of bi-stable stage 81 producing a —E voltage as the output of bi-stable stage 81, which is fed back to input 64 integrating amplifier 60. Thus a net negative voltage, $(-E-k_1E)$, appears at the inputs of integrator amplifier 60, causing the voltage at its output to change in the positive going direction at a constant rate proportional to the magnitude of such net negative voltage. Neglecting for the moment, the presence of input 78 of summing amplifier 70, when the voltage magnitude at the output of integrating amplifier 60 exceeds +E, the net input voltage applied to the input of summing amplifier 70 becomes positive which results in a switch-over of the polarity of outputs of the summing amplifier and of bi-stable stage 81. The input applied to terminal 64 of integrating amplifier 60 then becomes a positive voltage, +E, causing the direction of voltage change at the output of integrating amplifier 60 to reverse, and now change in a negative-going direction at a rate proportional to the sum of the two inputs, $E+k_1E$. When this negative-going output exceeds —E, another switch-over takes place and the cycle starts over again. Since the rate of positive-going voltage change or at output of integrating amplifier 60 is proportional to the difference between the inputs, and the rate of negative going change of output is proportional to the sum of the inputs, the period of time over which the voltage is rising is considerably longer than the period over which it is falling, producing what is known in the art as ramp waveform. Correspondingly, the period over which the output of bi-stable stage 81 is at its —E condition is very long to the period over which it is at its +E condition providing a rectangular waveform which appears at oscillator output terminal 82. This waveform is coupled to relay control input 54, where the positive portion of the waveform acts as a switch pulse to energize coil 28.

Coupled to delay interval control input 72 of sample rate oscillator 58 is the voltage appearing at output terminal 52 of sample and hold circuit 30. As previously described the net voltage appearing at inputs 68 and 76 of amplifier 70 determine the triggering threshold at which switch-over of bi-stable stage 81 takes place, and it is the rise of the ramp voltage at the output of integrating amplifier 60 to a value that applies a net positive voltage at the inputs of summing amplifier 70 which triggers the switch pulse output of the oscillator. The sampled amplitude signal from sampling circuit 30, which is applied to input terminal 76 of summing amplifier 70 through attenuator network 74 thus serves to vary the trigger threshold over a range of threshold variation equal to 2E multiplied by attenuation constant of proportionality $k_2$.

The output of sample and hold circuit 30 is applied to an input terminal 90 of an amplitude transfer circuit 92, having input-output characteristics as plotted in curve 94 of FIG. 2. Transfer circuit 92 may be of a suitable type such as a conventional diode function generator.

Table I, following, shows one form of derivation of the input voltage and output voltage values for transfer circuit 92, by means of values obtainable from any standard table of discrete values for a normal distribution curve, such as may be found at page 381 of "Introduction to Statistical Analysis," Dickson and Massey, published by McGraw Hill Co., New York, N.Y. 1957. The constant of proportionality, 0.457E, employed in the derivation of column 4 of Table I was chosen to convert 2.183, the maximum value in column 3, to unity. This choice of constant corresponds to scaling the values of column 3 to be bounded by the signal amplitudes ±E, the limits of signal amplitude applied to the input of circuit 92. The constant of proportionality 0.400E′, employed in the derivation of column 5 was chosen to convert 2.50, the maximum deviation tabulated in column 1 to unity, which corresponds to scaling the value of column 1 to be bounded by ±E′, the limits of signal amplitude of output of circuit 92. Certain trivial approximations were made in the tabulation shown, in order to expeditiously handle discrete values. For instance all but the first and last of the tabulated values of column 5, have been increased by .05E.

*Table I*

| Column 1 Regular Deviation from Arith. Mean ($\mu$) | Column 2 Normal curve Ordinate Y | Column 3 Cumulative summation of Y | Column 4 Input voltage (for input amplitudes having range ±E) Col. 3 multiplied by 0.457E | Column 5 Output voltage (for output amplitudes having a range ±E′) Col. 1 multiplied by 0.400E′ plus and minus 0.05E′ limit |
|---|---|---|---|---|
| ±0 | 0. 399 | 0. 399 | ±0. 183E | ±0. 05E′ |
| ±0. 25$\sigma$ | 0. 387 | 0. 786 | ±0. 360E | ±0. 15E′ |
| ±0. 50$\sigma$ | 0. 352 | 1. 138 | ±0. 521E | ±0. 25E′ |
| ±0. 75$\sigma$ | 0. 301 | 1. 439 | ±0. 659E | ±0. 35E′ |
| ±1. 00$\sigma$ | 0. 242 | 1. 681 | ±0. 770E | ±0. 45E′ |
| ±1. 25$\tau$ | 0. 183 | 1. 864 | ±0. 854E | ±0. 55E′ |
| ±1. 50$\sigma$ | 0. 130 | 1. 994 | ±0. 914E | ±0. 65E′ |
| ±1. 75$\sigma$ | 0. 086 | 2. 080 | ±0. 953E | ±0. 75E′ |
| ±2. 00$\sigma$ | 0. 054 | 2. 134 | ±0. 979E | ±0. 85E′ |
| ±2. 25$\sigma$ | 0. 032 | 2. 166 | ±0. 991E | ±0. 95E′ |
| ±2. 50$\sigma$ | 0. 017 | 2. 183 | ±1. 000E | ±1. 00E′ |

Transfer circuit 92 serves to redistribute amplitude values having a uniformly distributed distribution between limits, illustrated in conventional graphical manner, by line 95, FIG. 3, to a truncated normal Gaussian probability distribution, line 96. It can be demonstrated that the resultant output distribution, line 96, has a standard deviation equal to 2.50, that of the last value tabulated in column 1 of Table I. If desired, Table I may be expanded to include values for larger standard deviation which would result in the improved standard deviation of the shifted probability distribution 96, or by including a greater density of discrete numbers which would result in improving the quality of fidelity of the output distribution relative to an ideal normal distribution. It will be understood that while the tabulation of Table I has provided highly satisfactory results in an operational embodiment of the circuit of FIG. 1, that there are other analytical and tabulated value techniques by which essentially the same transfer curve 94 may be obtained.

A better understanding of the circuit 10 may be had from a study of several cycles of its operation, with reference to FIG. 4 wherein: waveform A is the output of integrating amplifier 60, waveform B is the output of bi-stable circuit 81, waveform C is the output of triangular wave oscillator 12, and waveform D is the output of sample and hold circuit 30. It is assumed that at time $T_0$ bi-stable circuit 81 in sampling rate oscillator 58 has just assumed its —E condition, and that the voltage at out terminal 52 of sample and hold circuit 30 is zero. The upper and lower limits of the trigger threshold for reversing the condition of bi-stable circuit 81 are shown by dashed lines 100, 102, respectively, on waveform A. During the cycle beginning at time $T_0$, the only negative voltage at the input of summing amplifier 70 will be the voltage —E, applied to terminal 84 from bi-stable circuit 81. Thus the trigger threshold level, line 104, waveform A, will equal +E, which is midway between the upper and lower limits of variability of threshold level, dashed lines 100, 102. When the ramp signal from integrating amplifier 60 reaches threshold 104 at time $T_1$ the output of bi-stable circuit 81 is reversed providing positive switching pulse 106, waveform B. Pulse 106 actuates relay coil 28 and stops oscillator 12, causing its output to remain stationary at a negative amplitude value 108, waveform C. The voltage at which waveform oscillator 12 is stopped is samped and held by circuit 30 stepping the voltage amplitude at terminal 52 to a level 110, corresponding to amplitude value 108, but of opposite polarity due to inversion by amplifier 46. After time $T_1$ the output of integrating amplifier changes in a negative-going direction at the more rapid rate reaching the value at which switch-over of bi-stable circuit 81 occurs at time $T_2$, whereupon switching pulse 106 is terminated and oscillation of circuit 12 is resumed. However, since sample and hold circuit continues to hold the sampled amplitude at its output terminal 52, the new triggering threshold for the cycle commencing at $T_2$ is determined by the positive voltage from terminal 52 applied to terminal 76, with the result that new threshold level 112, waveform A, is somewhat less than +E. Therefore, it will take more time for the constant rate ramp voltage to reach new threshold 110 at limit $T_3$, which period of time corresponds to the delay between switching pulses. Under repetitive cycling the voltage at output terminal 52 of sample and hold circuit 30 is periodically stepped between voltages of randomly variable amplitude uniformly distributed within the range ±E. Transfer circuit 92 operates on these amplitudes shifting their distribution to that of a normal or Gaussian distribution which then appears at terminals 98.

Preferably, the ratio of the frequency of waveform oscillator to the frequency of sampling rate oscillator is made large, the higher the ratio the better. Increasing the ratio of frequency of these oscillators improves the quality of uniform distribution of amplitudes at terminal 52 over the range ±E. The lower limit of frequency of waveform oscillator 12 is determined by the range of variation of delay interval between pulses of sampling oscillator 58, in turn determined by constant of proportionality $k_2$. The period of one cycle of waveform oscillator 12 must be larger than the range of time delay variation.

The following circuit specifications are included by way of example only, to produce a stepped signal of normally distributed randomly variable amplitudes at a rate of approximately one step every eleven seconds.

| | |
|---|---|
| Reference voltage, ±E ____________________v__ | ±100 |
| Frequency of waveform oscillator **12** ____c.p.s.__ | 30 |
| Resistors **40, 48** ______________________ohms__ | 5000 |
| Capacitor **50** __________________________mfd__ | 1 |
| Integrating amplifier **60**: | |
| Up rate _________________________v./sec__ | 20 |
| Down rate _____________________v./sec__ | 180 |
| Constant $k_1$ for bleeder **66** ____________________ | 0.8 |
| Constant $k_2$ for attenuator **74** ________________ | 0.1 |

Obviously many modifications and variations of the present invention are possible in the light of the above teachings. It is therefore to be understood that within the scope of the appended claims the invention may be practiced otherwise than as specifically described.

What is claimed is:

1. Apparatus for producing randomly variable amplitude signals having a Gaussian probability distribution, comprising, in combination:

(a) a signal generator for producing a signal having a repetitive waveform that varies in amplitude within a predetermined amplitude range, (b) an amplitude storage circuit, (c) co-operating means connected with the signal generator and the amplitude storage circuit to repetitively stop the signal generator and to communicate the amplitude at the output of the signal generator at the moment same is stopped to the amplitude storage circuit to produce sequential sampled amplitude signals at the output of the storage circuit, said co-operating means being operative to control the interval of time between stopping of the signal generator in accordance with said sampled amplitude signal to independently vary the amplitude of said sampled amplitude signal, whereby the probability of finding a sampled amplitude signal having any particular amplitude within said amplitude range is substantially uniform throughout the range, (d) said amplitude storage circuit having its output connected to an amplitude transfer circuit for redistributing the probability finding various amplitudes in said sampled amplitude signals to that of a substantially Gaussian probability distribution.

2. Apparatus in accordance with claim 1, said amplitude transfer having a transform characteristic of the type wherein the input amplitudes corresponding to equal interval output amplitude is derived by accumulating equal interval values of a Gaussian probability curve, said values being accumulative in each of the opposite directions of the curve away from the arithmetic mean datum of the curve with the amplitude value midway the limits of said amplitude range corresponding to said arithmetic mean datum.

3. Apparatus in accordance with claim 1 wherein the signal generator and said co-operating means are adapted to repeat the waveform and repetitively stop same at different frequencies, the period of one cycle of the waveform being at least greater than the period by which said period between stopping may vary under control of the co-operating means.

4. Apparatus in accordance with claim 1, said co-operating means including means for generating a repetitive rectangular switching pulse, and switch means operatively responsive to said switching pulse to stop the signal generator and to communicate the output of the signal generator to the storage circuit.

5. Apparatus in accordance with claim 4, said means for generating a repetitive rectangular switching pulse including means to control the interval between pulses in accordance with said sampled amplitude signal.

6. Apparatus in accordance with claim 1, said signal generator being a triangular waveform generator.

No references cited.

ARTHUR GAUSS, *Primary Examiner.*